United States Patent Office 3,510,485
Patented May 5, 1970

3,510,485
1-(N-ALKYL AND N,N-DIALKYLAMINOOXY)-3-ALKYLAMINO-s-TRIAZINES
Richard K. Brantley, Westminster, Del., assignor to E. I. du Pont de Nemours and Company, Wilmington, Del., a corporation of Delaware
No Drawing. Filed July 6, 1967, Ser. No. 651,375
Int. Cl. C07d 55/46
U.S. Cl. 260—249.5      4 Claims

ABSTRACT OF THE DISCLOSURE

Novel s-triazines such as 6-chloro-4-diethylaminooxy-2-isopropylamino-s-striazine as a selective herbicide with low residual effects.

BACKGROUND OF THE INVENTION

This invention relates to s-triazine derivatives exhibiting utility as selective herbicides.

There is a continuing need to develop herbicides that are well tolerated by crop plants and are also effective against undesirable plants. Many compounds presently employed as herbicides demonstrate this property of selective activity. A number of the presently known selective herbicides exhibit herbicidal activity for periods that are longer than a single growing season. This residual activity is an undesirable property when the farmer desires to rotate his crops, as the choice of the replacement crop is limited due to inhibition of some crop species by the herbicide remaining in the soil.

The compounds of this invention do not exhibit residual herbicidal activity, and, therefore, are suitably employed when a selective herbicide without residual effects is needed.

SUMMARY OF THE INVENTION

This invention relates to 1-(N-alkyl and N,N-dialkylaminooxy)-3-alkylamino-s-triazines as selective herbicides.

The compounds of this invention are represented by the formula:

(1)
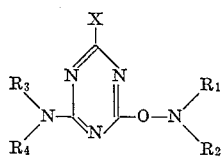

wherein $R_1$ and $R_2$ are hydrogen or alkyl of 1 through 4 carbons, with the proviso that one of $R_1$ and $R_2$ must be alkyl;
$R_3$ and $R_4$ are hydrogen, alkyl of 1 through 4 carbons, —$(CH_2)_2OCH_3$ or —$(CH_2)_3OCH_3$, with the proviso that only one of $R_3$ and $R_4$ can be hydrogen; and
X is fluorine, chlorine, bromine, $OR_5$ or $SR_5$ where $R_5$ is alkyl of 1 through 5 carbons.

The compounds of this invention are useful as selective herbicides against grasses and broadleaves. These compounds are effective as both pre-emergence and post-emergence herbicides.

Another aspect of this invention are formulations of the compounds of this invention either singly or in combination with other agents as herbicides to control weeds.

DESCRIPTION OF THE PREFERRED EMBODIMENTS

Generally the compounds of this invention are prepared by the reaction of an hydroxylamine and an amine with cyanuric chloride to give a 1-N-alkylaminooxy-3-alkyl-amino-s-triazine or 1 - N,N - dialkylaminooxy - 3 - alkyl-amino-s-triazine. This product can then be reacted with a suitable alkoxide or mercaptide to introduce an alkoxyl or alkylmercapto group in the remaining position.

Cyanuric bromide or cyanuric fluoride can be substituted for cyanuric chloride in the reaction to obtain a bromo or fluoro group in the final product.

The relative order with which the cyanuric halide is reacted with amine, hydroxylamine and mercaptide or alkoxide is not critical, but yields of a desired compound can be maximized by proper selection of order of reaction and conditions of the reaction.

The compounds of Formula 1 where either $R_1$ or $R_2$ is hydrogen can best be prepared from an alkyl hydroxyl-amine derivative where one position is blocked by a group which can be subsequently removed. An acyl group serves this function well. After the alkyl, acyl hydroxyl-amine is attached to the triazine ring, the acyl group can be removed by carefully controlled hydrolysis which will remove said acyl group but will not attack the other functional groups on the molecule.

Reaction conditions for each step of the synthesis should be carefully chosen. Generally, the first halogen on the triazine ring is replaced at about 0° C., the second at about 30° C. and the third at about 70° C. The reactions can be carried out in aqueous or nonaqueous solvents. The presence of a solvent which contains an acid acceptor is preferred. This acid acceptor can be one of the reactants such as an excess of the amine or hydroxyl-amine employed in the reaction, or a nonreactant such as a tertiary amine, alkali metal hydroxide solution, carbonate solution or bicarbonate solution.

It should also be noted that the compounds of this invention form salts with strong acids. These salts are often preferred over the free base for the manufacture of formulations.

The compounds of this invention exhibit excellent selective herbicidal activity at rates of 0.5–10 kg. of active ingredient per hectare on grasses and broadleaves when used in either pre-emergence or directed post-emergence applications. Some advantages, however, can be gained by incorporating the material into the soil immediately after application.

Crops which are tolerant to these compounds include sorghum, field and sweet corn, sugar cane, asparagus, soy beans, rice and wheat. Sorghum and corn are exceptionally tolerant. Susceptible weeds include but are not limited to the following: crabgrass, *Digitaria spp.*; barnyard grass, *Echinochloa crusgalli*; wild oats, *Avena fatua*; sicklepod, *Cassia tora*; morning glory, *Ipomoea spp.*; mustard, *Brassica spp.*; dock, *Rumex spp.*; ragweed, *Ambrosia artemisifolia*; lamb's quarters, *Chenopodium album*; pigweed, *Amaranthus retroflexus*; chickweed, *Stellaria spp.*; henbit, *Lamium amplexicaule*; fiddleneck, *Amsinckia spp.*; tartary buckwheat, *Fagopyrium tartaricum*; foxtail, *Setaria spp.*; cocklebur, *Xanthium pennsylvanicum*; velvetleaf, *Abutilon theophrasti*; and smartweed, *Polygonum spp.*

The compounds of this invention can be used singly or in combination with other chemicals which are useful in agronomic and horticultural management and which are compatible with the compounds of this invention. Such chemicals may be, but are not restricted to, the classes of chemicals commonly known as herbicides, insecticides, fungicides, plant nutrients, fertilizers and nematocides.

The compounds of this invention, when used together with the following herbicides, often give unusual and beneficial results, and are especially useful for selective weed control in crop areas: 2-chloro-4-ethylamino-6-isopropylamino - s-triazine; N-isopropyl-2-chloroacetanilide; 2-chloro-2',6'-diethyl-N-methoxymethyl acetanilide; 2-chloro-2',6'-diethyl-N-isopropylacetanilide; 2 - chloro-N,N-diallylacetamide; 1-(3,4-dichlorophenyl)-3-methoxy- 3-methylurea. A total of 0.5–10 kg. per hectare of the combination can be used in a ratio of 1:10::10:1.

A better understanding of this invention will be gained by reference to the following examples illustrating the preparation of some compounds of this invention. Parts are by weight unless otherwise specified.

EXAMPLE 1

A solution of 9.2 parts cyanuric chloride in 60 parts acetone is poured over 100 parts of ice contained in a vessel equipped with a stirring device and a cooling bath. To this solution 4.5 parts of N,N-diethylhydroxylamine is added with constant stirring followed by slow addition of a solution of 2 parts sodium hydroxide in 25 parts water. The temperature of the reaction system is maintained at or near 0° C. until the pH of the system approaches 7. Then 3 parts of isopropylamine is added followed by slow addition of a solution of 2 parts sodium hydroxide in 25 parts water. The temperature of this mixture is permitted to rise to 30° C., and is maintained at this temperature, with constant stirring, until the pH approaches 7.

The mixture is thoroughly extracted with methylene chloride. This extract is then dried with anhydrous magnesium sulfate, filtered and the solvent removed under vacuum.

The resulting material is essentially pure 6-chloro-2-diethylaminooxy-4-isopropylamine-s-triazine.

EXAMPLES 2–5

Example 1 is repeated substituting the indicated reactant for the isopropylamine of Example 1 to obtain the indicated product.

| Ex. | Reactant | Product |
|---|---|---|
| 2 | Dimethylamine | 6-chloro-4-diethylaminooxy-2-dimethylamino-s-triazine. |
| 3 | Di-n-butylamine | 6-chloro-4-diethylaminooxy-2-dibutylamino-s-triazine. |
| 4 | 2-methoxyethylamine | 6-chloro-4-diethylaminooxy-2-(2-methoxyethylamino)-s-triazine. |
| 5 | 3-methoxypropylamine | 6-chloro-4-diethylaminooxy-2-(3-methoxypropylamino)-s-triazine. |

EXAMPLE 6

Example 1 is repeated substituting an equimolar amount of cyanuric bromide for the cyanuric chloride of Example 1 resulting in the formation of 6-bromo-2-diethylaminooxy-4-isopropylamino-s-triazine.

EXAMPLE 7

Example 1 is repeated substituting an equimolar amount of cyanuric fluoride for the cyanuric chloride of Example 1 resulting in the formation of 6-fluoro-2-diethylaminooxy-4-isopropylamine-s-triazine.

EXAMPLE 8

6 - chloro - 4 - isopropylamino - 2-diethylaminooxy-s-triazine is prepared according to the procedure of Example 1. Twenty-five and seven-tenths parts of this material is dissolved in 250 parts methanol. To this solution is added a solution of five and four-tenths parts sodium methoxide in 100 parts methanol. The resulting mixture is boiled under reflux for 1 hour. The solvent is removed by evaporation at reduced pressure and at a temperature not exceeding 50° C. The residue, after evaporation, is washed with 100 parts water and dried. This residue is nearly pure 6-methoxy-4-isopropylamino-2-diethylaminooxy-s-triazine.

EXAMPLE 9

Example 8 is repeated substituting an equimolar amount of sodium n-amylmercaptide for the sodium methoxide of Example 8 resulting in the formation of 6-n-amylmercapto-4-isopropylamino-2 - diethylaminooxy-s-triazine.

EXAMPLE 10

Example 1 is repeated substituting an equimolar amount of N-methyl formhydroxamic acid for the N,N-diethylhydroxylamine of Example 1. After reaction with isopropylamine the reaction mixture is made strongly acidic with hydrochloric acid and is warmed to 50° C., said temperature being maintained for about one hour, and then is neutralized with sodium bicarbonate. The resulting 6-chloro-4-isopropylamino-2-N - methylaminooxy-s-triazine is cooled and isolated as described in Example 1.

EXAMPLE 11

Example 10 is repeated, substituting an equimolar amount of N - butylformhydroxamic acid for the N-methylhydroxamic acid of Example 10 to obtain 6-chloro-4-isopropylamino-2-N-n-butylaminooxy-s-triazine.

EXAMPLE 12

Example 1 is repeated substituting equimolar amounts of ethylamine for the N,N-diethylhydroxylamine and N,N-dimethylhydroxylamine for the isopropylamine of Example 1 to obtain 6-chloro-4-dimethylaminooxy-2-ethylamino-s-triazine.

EXAMPLE 13

Example 1 is repeated substituting equimolar amounts of ethylamine for the N,N-diethylhydroxylamine and N,N-dibutylhydroxylamine for the isopropylamine of Example 1 to obtain 6-chloro-4-dibutylaminooxy-2 - ethylamino-s-triazine.

For convenience in application, compounds of Formula 1 can be formulated in conventional ways as wettable powders, granules, dusts, emulsifiable concentrates, solution, etc., by combination with suitable inert diluents, solvents, surfactants, and other adjuvants.

The surface active agents or surfactants can include any of the anionic, cationic and nonionic surface active agents. A detailed list of such agents is set forth in "Detergents and Emulsifiers, 1967 Annual" by John W. McCutcheon, Inc. Among the prefered surfactants are those anionic and nonionic agents recognized in the art as wetting agents, dispersants or emulsifiers. Some examples of preferred anionic surfactants are: alkali metal salts of alkylarylsulfonic acids such as dodecylbenzenesulfonic acid and alkylnaphthalenesulfonic acid; fatty alcohol sulfates, such as sodium lauryl sulfate; dialkyl sodium sulfosuccinates, particularly the dioctyl ester; sodium N-methyl-N-oleyltaurate; sodium dodecyldiphenyl ether disulfonate; and fatty acid esters of sodium isothionate. Examples of preferred nonionic surfactants are: alkylphenoxy poly(ethyleneoxy) ethanols such as octyl-, dodecyl-, and nonylphenol adducts with ethylene oxide; alkyl alcohol polyethylene glycol ethers such as trimethylnonyl polyethylene glycol ethers; and polyethylene oxide adducts with fatty acids, rosin acids, long chain alkyl mercaptans, sorbitol fatty acid esters, or polypropylene oxides. Especially preferred because of their high order of dispersant activity are alkali metal and alkaline earth salts of ligninsulfonic acids and polymeric alkylnaphthalenesulfonic acids; methyl cellulose and polyvinyl alcohol.

Surfactants can be present in the formulations of this invention in the range of 0.1 to 20% by weight. The range of 0.2 to 10% is preferred. Larger amounts of surfactant can be present, but when it is desired to apply the products with such gross amounts of surfactant spray-tank mixing is more practical.

Free-flowing powders or dusts can be prepared by combining one or more of the compounds of Formula 1 with solid extenders commonly employed in the herbicidal art. Such solid extenders include finely divided materials such as natural clays, e.g., attapulgite or kaolinite; diactomaceous earth; pyrophyllite; talc; synthetic mineral fillers derived from silica and silicates, such as synthetic fine silica; calcium or magnesium silicates, carbonates, phosphates and sulfates; lime; and flours derived from natural sources such as walnut shell, redwood, cotton seed, and the like. Wettable powders will additionally contain suitable surfactants.

Powder formulations can be prepared in a conventional manner by blending the ingredients and, usually, grinding in a hammer mill, fluid energy mill, or the like to insure complete blending, deagglomeration, and a particle size somewhat under 50 microns. Wettable powders and dusts can be blended with additional diluents to produce compositions of lower strength. Dry solid formulations will ordinarily contain 55% or less of a compound of Formula 1. Preferred ranges for wettable powders are:

| | Percent |
|---|---|
| Compound of Formula 1 | 10–50 |
| Wetting agent | 0.5–4 |
| Dispersant | 0–5 |
| Inert solid diluent | 41–89.5 |

Preferred ranges for dusts are:

| | |
|---|---|
| Compound of Formula 1 | 2–50 |
| Surfactant | 0–5 |
| Inert solid diluent | 45–98 |

Powder formulations of compounds of Formula 1 can be converted to granules by methods known to the art, which include the steps of adding moisture and drying. Devices such as granulating pans and mechanical mixers can be used, or pellets may be extruded and cut. The pellets may be used as such or reduced in size in conventional crushers to produce granular particles ranging from 2.5 mm. to 0.25 mm. in size such as are commonly used in granular applications. In preparation of granules from powders, it is frequently desirable to include a water soluble binder, which can be, for example, an inorganic salt such as sodium sulfate, or a water soluble organic compound such as urea, ligninsulfonate salts, methyl cellulose, etc. The granules will ordinarily contain less than 55% active ingredient. Preferred ranges of ingredients for such formulations on a dry basis are:

| | Persent |
|---|---|
| Compound of Formula 1 | 0.5–30 |
| Binder | 2–15 |
| Surfactants | 0–5 |
| Inert solid diluents | 50–97.5 |

The amount of water or other liquid needed in the course of preparation depends on the particular ingredients chosen and can be readily determined by one skilled in the art. In general from a few percent to as much as 15–50% may be required. Water will subsequently be removed by drying, generaly until less than 1% by weight remains.

Granular formulations can also be prepared by spraying one or more compounds of Formula 1 over the surface of preformed clay granules or other absorptive granular materials such as Perlite, granulated corn cobs, expanded vermiculite, and the like. Because the compounds of this invention, in the state usually prepared for formulation, are viscous oils or low melting solids, it is most convenient to spray a concentrated solution in a volatile, inert solvent such as methylene chloride, or to warm the material slightly before spraying. Solvents of low volatility may be used and these remain in the granules. Surfactants may be included to aid in release of the active ingredient from the granules. Preferred ranges for such compositions are:

| | Percent |
|---|---|
| Compound of Formula 1 | 0.5–30 |
| Surfactant | 0–6 |
| Granular carrier | 70–99.5 |

Organic solvents for use in preparing solutions or emulsifiable concentrates include those normally used in the herbicidal art. Preferred solvents are hydrocarbon solvents of aromatic character, such as heavy aromatic naphtha, alkylnaphthalenes, xylene and the like, and chlorinated hydrocarbon solvents. Ketones, esters and the like, and combinations of solvents can also be used. When suitable emulsifying surfactants are included, the resulting emulsifiable concentrate can be extended with water for application. Those compounds which are oils can of course be combined with surfactant alone to produce emulsifiable concentrates, but because of the high viscosity of such concentrates it is preferred to add some solvent. In general, liquid formulations can contain 10–90% active ingredient and 10–90% solvent. Preferred emulsifiable concentrates will include:

| | Percent |
|---|---|
| Compound of Formula 1 | 20–90 |
| Surfactant | 2–10 |
| Solvents | 0–78 |

Salts of compounds of Formula 1 with strong acids are water soluble at practical use concentrations, and can be formulated as solid, water-soluble concentrates. Such compositions will include an acid salt of at least one compound of Formula 1 and conditioning agents, such as finely divided inert solid diluents, to prevent caking of the product in storage. A surfactant may be included to improve wetting and rate of solution. Such compositions will consist mainly of the active salt. The solid conditioning agent can be present in the range of 0.5–40% by weight and surfactant in the range of 0.5–10% by weight. Preferred water soluble compositions will include:

| | Percent |
|---|---|
| Salt of Compound of Formula 1 | 85–99.5 |
| Inert solid diluent (conditioner) | 0.5–15 |
| Surfactant | 0–14.5 |

For maximum shelf life, moisture and oxygen levels should be kept low by choice of suitable ingredients and containers. Mixtures other than the water-soluble salts formulations should have a nearly neutral pH or be weakly basic. The compositions may also contain additives to reduce foam, inhibit corrosion, prevent caking, increase flocculation, initative catalytic sites on clays, color the product for identification, etc. The use of such additives is well known in the art.

When compositions containing a compound of Formula 1 in combination with other herbicides and pesticides are desired, they may be prepared in the manner described above substituting the additional active ingredient for a like amount of a compound of this invention. It is simplest, of course, to use liquid formulations with liquid pesticides and solid formulations with solid pesticides, but by proper choice of ingredients considerable latitude can be obtained.

For a better understanding of the manner in which the compounds of this invention are employed, the following examples of typical herbicidal formulations of the compounds of this invention and their use are presented. Parts are by weights unless otherwise indicated. These examples are given as an illustration only and are not meant to limit the scope of this invention.

EXAMPLE 14

A wettable powder is obtained when the following ingredients are blended, air milled to a particle size below 20 microns, and reblended:

| | Parts |
|---|---|
| 6-chloro-4-isopropylamino-2-diethlaminooxy - s-triazine | 25 |
| Dioctyl sodium sulfosuccinate | 1 |
| Sodium ligninsulfonate | 2 |
| Synthetic fine silica | 2 |
| Urea | 0.7 |
| Attapulgite | 69.3 |

The resulting wettable powder is applied preemergence in the spring at a rate of 2 kg. active ingredient per hectare to a newly-planted plot of field corn. Excellent control of barnyardgrass (*Echinochloa crusgalli*), common ragweed (*Ambrosia trifida*) and lambsquarter (*Chenopodium album*) is obtained for a period of six weeks following treatment. The application does not, however, injure the field corn crop. That this formulation further results in low residual presence of the herbicidally active ingredient in the soil is evidenced by the fact that no noticeable adverse effects are noted when winter oats are planted in the same plot in the fall following soil treatment.

EXAMPLE 15

A wettable powder is prepared as in Example 14 substituting a mixture of 12.5 parts 2-chloro-2',6'-diethyl-N-methoxy methylacetanilide and 12.5 parts 6-chloro-4-isopropylamino - 2 - diethylaminooxy-s-triazine for the 25 parts of 6-chloro-4-isopropylamino - 2 - diethylaminooxy-s-triazine of Example 14.

This wettable powder is applied pre-emergence to a newly-planted field of corn at a rate of 2 kg. active ingredient per hectare in 75 liters of water.

The corn germinates and grows rapidly free of competition from weeds such as yellow foxtail, barnyardgrass, goosegrass and lambsquarters, with a resulting fine harvest.

EXAMPLE 16

A wettable powder is obtained when the following ingredients are blended and milled to a particle size essentially below 50 microns.

| | Parts |
|---|---|
| 6-bromo-4-diethylamino-2-dimethylaminooxy - s - triazine | 50 |
| Sodium alkylnaphthalenesulfonate | 3 |
| Calcium ligninsulfonate | 3 |
| Diatomaceous earth | 30 |
| Kaolinite | 10 |
| Pyrophyllite | 4 |

As these ingredients are being ground in the hammer mill, feed and air flow rates are maintained at a level sufficient to prevent heating of the mill. The resulting product is then reblended and screened through a U.S. 5.50-mesh (0.3 mm. opening) screen.

This wettable powder is applied at a rate of 2 kg. active ingredient per hectare to an area of newly-planted field corn with similar results to those obtained with the formulation of Example 14.

EXAMPLE 17

A herbicidal dust is obtained by blending 10 parts of 6-n-amyloxy - 4 - isobutylamino-2-methylaminooxy - s - triazine with 40 parts of kaolinite, 48 parts of talc and 2 parts of synthetic magnesium carbonate. This mixture is then hammer milled and reblended.

This dust is applied to an area of newly-planted field corn. Weeds such as wild oats (*Avena fatua*), seedling morning glory (*Ipomoea purpurea*), mustard and henbit (*Lamium amplexicaule*) are controlled allowing the field corn to grow rapidly with a resulting fine harvest.

EXAMPLE 18

Herbicidal granules are prepared by blending 25 parts of 6-chloro-4-methylamino - 2 - ethylaminooxy-s-triazine with 10 parts sodium sulfate, anhydrous, 5 parts calcium/magnesium lignin sulfonate, 1 part sodium alkylnaphthalene-sulfonate and 59 parts calcium/magnesium bentonite. This mixture is hammer milled and then moistened with approximately 12 parts water. This moistened mixture is extruded to form cylinders approximately 3 mm. in diameter which are then cut into approximately 3 mm. lengths. These pellets are dried and crushed through a screen having approximately 0.84 mm. openings. This crushed material is screened; the particles of from 0.84 to 0.42 mm. are packaged for use; and the finer particles are recycled.

These granules are applied pre-emergence at a rate of 10 kg. of active ingredient per hectare to a field of grain sorghum. Complete control of the growth of redroot pigweed (*Amaranthus retroflexus*) and crabgrass (*Digitaria spp.*) is obtained until closing-in time, with a resultant satisfactory yield of sorghum being obtained.

EXAMPLE 19

Ten parts of the wettable powder of Example 14 is blended in a rotating mixer with 74 parts gypsum and 16 parts potassium sulfate. While rotating approximately 20 parts of water is sprayed on the mixture to accomplish granulation. When the granules reach the desired size, they are removed and dried. The final product contains granules of from 1.0 mm. to 0.5 mm. in size. These granules contain approximately 2.5% active ingredient and are suitable for application as described in Example 17.

EXAMPLE 20

A mixture of 10 parts of 6-methylthio-4-ethylamino-2-diethylaminooxy-s-triazine and 5 parts of methylene chloride is sprayed upon 90 parts of attapulgite clay granules in a V-blender. The granules selected have a particle size of from 0.84 mm. to 0.42 mm. The granules are allowed to dry while tumbling and then packaged.

This product is suitable for control of weeds in a corn crop and gives a result similar to that described in Example 14.

EXAMPLE 21

An emulsifiable concentrate is prepared by mixing 25 parts of 6-methoxy-4-(3-methoxypropylamino)-2-methyl-aminooxy-s-triazine with 5 parts of mixed polyoxyethylene ethers and oil soluble sulfonates and 70 parts of alkylated naphthalene comprised principally of 2-methylnaphthalene. This mixture is then stirred until homogeneous.

This emulsifiable concentrate is extended with water and sprayed over a field of newly sprouting ratoon sugar cane at the rate of 7 kg. of active ingredient per hectare. This treatment provides good control of crabgrass (*Digitaria spp.*) chickweed (*Stellaria spp.*) and henbit (*Lamium amplexicaule*) for a period of 5 weeks after spraying. These weeds do, however, grow profusely in untreated control plots scattered throughout the treated area. The sugar can grows well and shows no injurious symptoms.

EXAMPLE 22

A mixture of 80 parts 6-ethylthio-4-isopropylamino-2-diethylaminooxy-s-triazine, 10 parts xylene and 10 parts of a blend of oil soluble sulfonates with polyoxyethylene ethers is stirred at a temperature of 45° C. until homogeneous to obtain an emulsifiable concentrate.

This emulsifiable concentrate is extended with water and applied pre-emergence to a fall-planted field of winter wheat with a history of heavy infestations of wild oats (*Avena fatua*). In addition to controlling the growth of wild oats, excellent control of fiddleneck (*Amsinckia spp.*) and tartary buckwheat (*Fagopyrum tataricum*) is also demonstrated. The winter what is not injured by this treatment.

EXAMPLE 23

A mixture of 50 parts 6-chloro-4-isobutylamino-2-dimethylaminooxy-s-triazine, 8 parts of a blend of calcium alkylarylsulfonate and alkylphenoxy-polyethylene oxide concentrate and 42 parts of heavy aromatic naphtha is stirred until homogeneous to form an emulsifiable concentrate.

This concentrate is extended with water and applied pre-emergence to a field of soybeans at a rate of 0.5 kg. of active ingredient per hectare. Acceptable control of yellow foxtail (*Setaria glauca*), cocklebur (*Xanthium*

*pennsylvanicum*), velvetleaf (*Abutilon theophrasti*) and Pennsylvania smartweed (*Polygonum pennsylvanicum*). The soybeans exhibit minor chlorosis which is subsequently outgrown and the yield is normal.

EXAMPLE 24

A solution of 2 parts 6-chloro-4-methylethylamino-2-methylethylaminooxy-s-triazine, 1 part polyhydric alcohol ester and 2 part aromatic naphtha is warmed and sprayed on 94.8 parts corn cob grits in a rolling blender. When the solution has been absorbed, 0.2 part talc is added and the mixture is packaged.

These granules may be used in the same fashion as the granules of Example 23 with similar results.

EXAMPLE 25

A solution of 9.2 parts cyanuric chloride in 60 parts acetone is poured over 100 parts of ice contained in a vessel equipped with a stirring device and a cooling bath. To this solution 4.5 parts of N,N-diethylhydroxylamine is added with constant stirring followed by slow addition of a solution of 2 parts sodium hydroxide in 25 parts water. The temperature of the reaction system is maintained at or near 0° C. until the pH of the system approaches 7. Then 3.6 parts of tert-butylamine is added followed by slow addition of a solution of 2 parts sodium hydroxide in 25 parts water. The temperature of this mixture is permitted to rise to 30° C., and is maintained at this temperature, with constant stirring, until the pH approaches 7.

The mixture is thoroughly extracted with methylene chloride. This extract is then dried with anhydrous magnesium sulfate, filtered and the solvent removed under vacuum.

The resulting material is essentially pure 6-chloro-4-diethylaminooxy-2-tert-butylamino-s-triazine.

EXAMPLE 26

A solution of 9.2 parts cyanuric chloride in 60 parts acetone is poured over 100 parts of ice contained in a vessel equipped with a stirring device and a cooling bath. To this solution 4.5 parts of N,N-diethylhydroxylamine is added with constant stirring followed by slow addition of a solution of 2 parts sodium hydroxide in 25 parts water. The temperature of the reaction system is maintained at or near 0° C. until the pH of the system approaches 7. Then 2.25 parts of ethylamine is added followed by slow addition of a solution of 2 parts sodium hydroxide in 25 parts water. The temperature of this mixture is permitted to rise to 30° C., and is maintained at this temperature, with constant stirring, until the pH approaches 7.

The mixture is thoroughly extracted with methylene chloride. This extract is then dried with anhydrous magnesium sulfate, filtered and the solvent removed under vacuum.

The resulting material is essentially pure 6-chloro-4-diethylaminooxy-2-ethylamino-s-triazine.

I claim:
1. A compound of the formula where

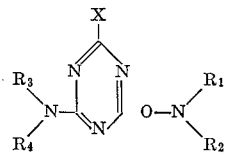

$R_1$ and $R_2$ each is a member selected from the group consisting of hydrogen and alkyl of one through four carbons, with the proviso that one of $R_1$ and $R_2$ must be alkyl;

$R_3$ and $R_4$ each is a member selected from the group consisting of hydrogen, alkyl of one through four carbons, —$(CH_2)_2OCH_3$ and —$(CH_2)_3OCH_3$, with the proviso that only one of $R_3$ and $R_4$ can be hydrogen; and X is a member selected from the group consisting of fluorine, chlorine, bromine, —$OR_5$, and —$SR_5$ where $R_5$ is alkyl of one through 5 carbons.

2. 6 - chloro-4-diethylaminooxy-2-isopropylamino-s-triazine.

3. 6-chloro - 4 - diethylaminooxy-2-tert-butylamino-s-triazine.

4. 6-chloro - 4 - diethylaminooxy-2-ethylamino-s-triazine.

References Cited

UNITED STATES PATENTS 3,265,690   8/1966   Matter et al. ____ 260—249.5 XR

FOREIGN PATENTS 1,232,588   1/1967   Germany.

HENRY R. JILES, Primary Examiner

J. M. FORD, Assistant Examiner

U.S. Cl. X.R.

71—93